United States Patent [19]
Keith

[11] Patent Number: 5,813,514
[45] Date of Patent: Sep. 29, 1998

[54] AUTOMATED END LOADING PALLET SYSTEM

[75] Inventor: Malcolm E. Keith, West Chicago, Ill.

[73] Assignee: Midaco Corporation, Elk Grove Village, Ill.

[21] Appl. No.: 575,138

[22] Filed: Dec. 19, 1995

[51] Int. Cl.[6] .................................................. B65G 37/00
[52] U.S. Cl. ................................. 198/346.2; 198/346.1
[58] Field of Search ............................. 198/346.1, 346.2

[56] References Cited

U.S. PATENT DOCUMENTS

| | | | |
|---|---|---|---|
| 4,144,960 | 3/1979 | Scourtes | 198/346.1 |
| 4,799,582 | 1/1989 | Itoh | 198/346.1 |
| 5,062,190 | 11/1991 | Kitamura | 198/346.1 X |
| 5,067,703 | 11/1991 | Keith | 271/164 |
| 5,167,405 | 12/1992 | Cayley, Jr. | 269/309 |
| 5,249,662 | 10/1993 | Nakano et al. | 198/346.1 |
| 5,286,148 | 2/1994 | Cayley, Jr. | 409/219 |
| 5,346,051 | 9/1994 | Keith | 198/346.1 |
| 5,370,212 | 12/1994 | Mizutani et al. | 198/346.1 |

FOREIGN PATENT DOCUMENTS

| | | | |
|---|---|---|---|
| 63-16942 | 1/1988 | Japan | 198/346.1 |
| 4-72220 | 3/1992 | Japan | 198/346.1 |

*Primary Examiner*—James R. Bidwell
*Attorney, Agent, or Firm*—Hill, Steadman & Simpson

[57] ABSTRACT

An automatic pallet changing system for an automatic machine that has at least two pallet extenders which can be operated to place and remove pallets on a receiver moved by the carriage of the automatic machine so that the pallets can be changed when machine operators are not present.

8 Claims, 7 Drawing Sheets

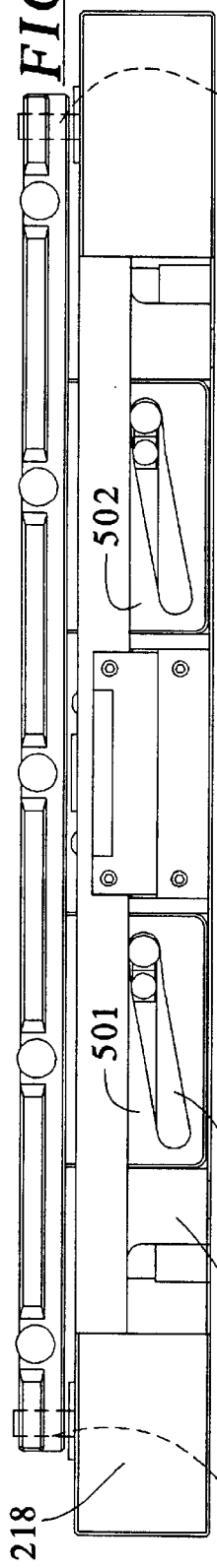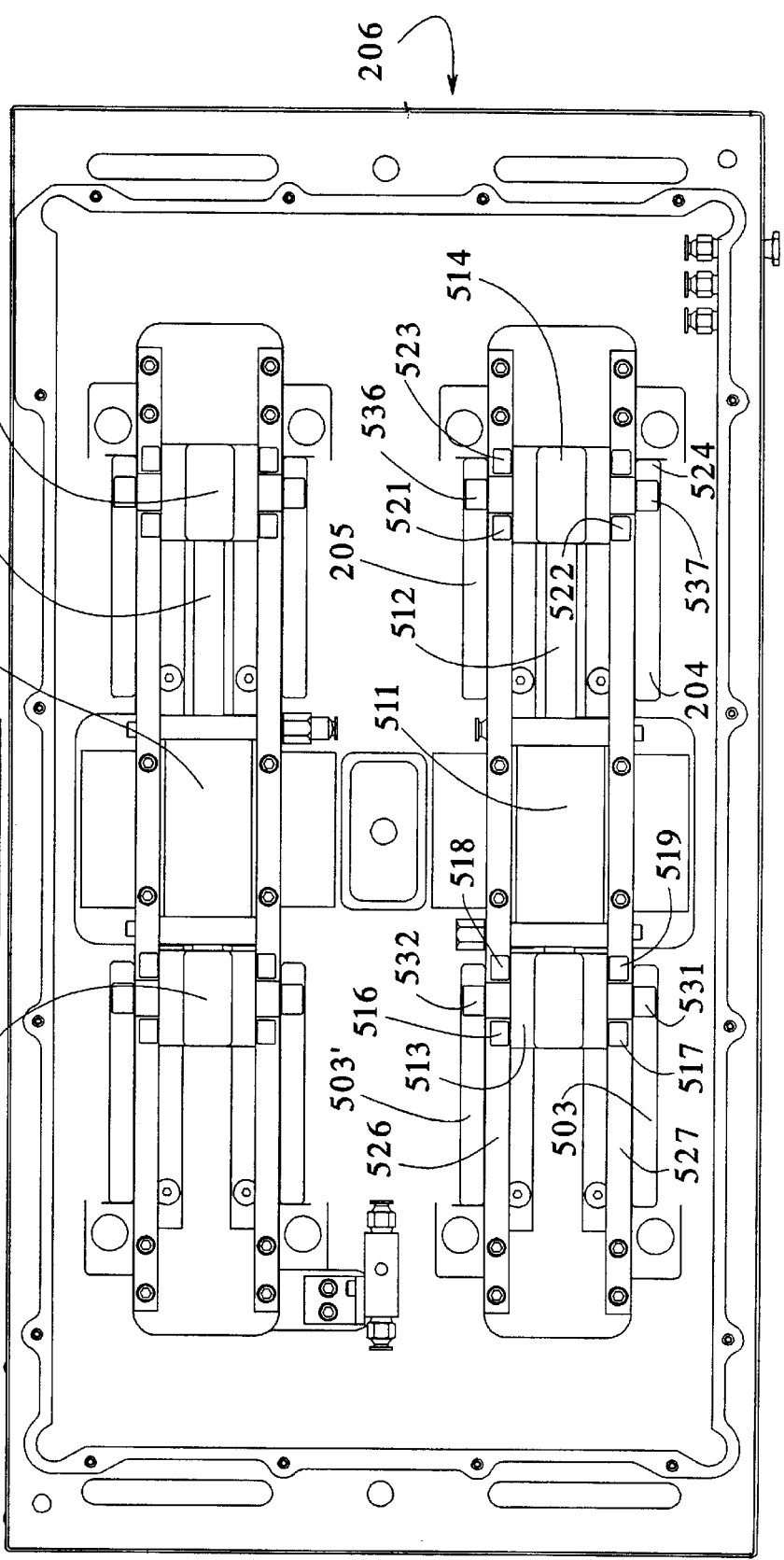

AUTOMATED END LOADING PALLET SYSTEM

BACKGROUND OF THE INVENTION

1. Field of the Invention

This invention relates in general to an automatic pallet loading system and in particular to a pallet system which allows a plurality of pallets to be automatically loaded onto a machine.

2. Description of the Related Art

Pallet loading systems are known in the prior art. For example, U.S. Pat. No. 5,346,051 shows a quick-changeover pallet system. See also U.S. Pat. No. 5,286,148 assigned to the assignee of the present application, and U.S. Pat. No. 5,167,405 assigned to the same assignee as the present invention.

SUMMARY OF THE INVENTION

The present invention comprises an automatic pallet changing system which allows two or more pallets to be automatically placed in an automatic machine such as an automatic vertical machining center which is capable of performing a number of operations to produce a furnished part from a blank work piece mounted on the pallet. The present invention comprises a pair of pallet supporting members upon which pallets can be mounted and moved into and out of a machining center where they are received upon a receiver that has two positions. One position where the pallet is received from the pallet carriage, and the other position where the pallet is locked in a down position for machining the workpiece mounted on the pallet. The receiver is carried by the automatic movable table of the machining center, and after the pallet is locked on the pallet receiver, the workpiece on the pallet is machined into a finished piece. Such machining may take a substantial period of time, as for example, two or three hours after which the machine automatically moves the pallet receiver and pallet with the finished piece to a discharge position and the receiver moves to an up position, which engages an arm of a carriage on one of the two pallet moving members which engages it and then moves it out of the automatic machine. The receiver then moves to a position adjacent the other one of the pallet moving members and the pallet and the unfinished workpiece on the other pallet are moved by the second pallet moving member, and carriage into the machine and onto the receiver which then proceeds to perform machining on the second workpiece.

It is seen that this invention provides a system for automatically loading and removing pallets with workpieces thereon for a machining center. The system of the invention allows the machining center to operate while not being monitored by employees, as for example, after hours when the employees have gone home. For example, if an employee loads two pallets on the apparatus of the invention, a first pallet can be placed in the machine and the workpiece can be machined over a period of two or three hours after which the finished part and pallet is removed from the machine and a second pallet with an unmachined part inserted into the machine. Thus, the automatic machine can continue to operate and produce finished parts after the employees have left the plant and, thus, a substantial increase in production can be achieved.

It is thus a further object of the invention to provide an improved pallet loading machine which can be automatically operated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 6 is a bottom plan view illustrating the pallet receiver;

FIG. 7 is a side plan view of the pallet receiver;

DETAILED DESCRIPTION OF THE PREFERRED EMBODIMENTS

Figure 1:
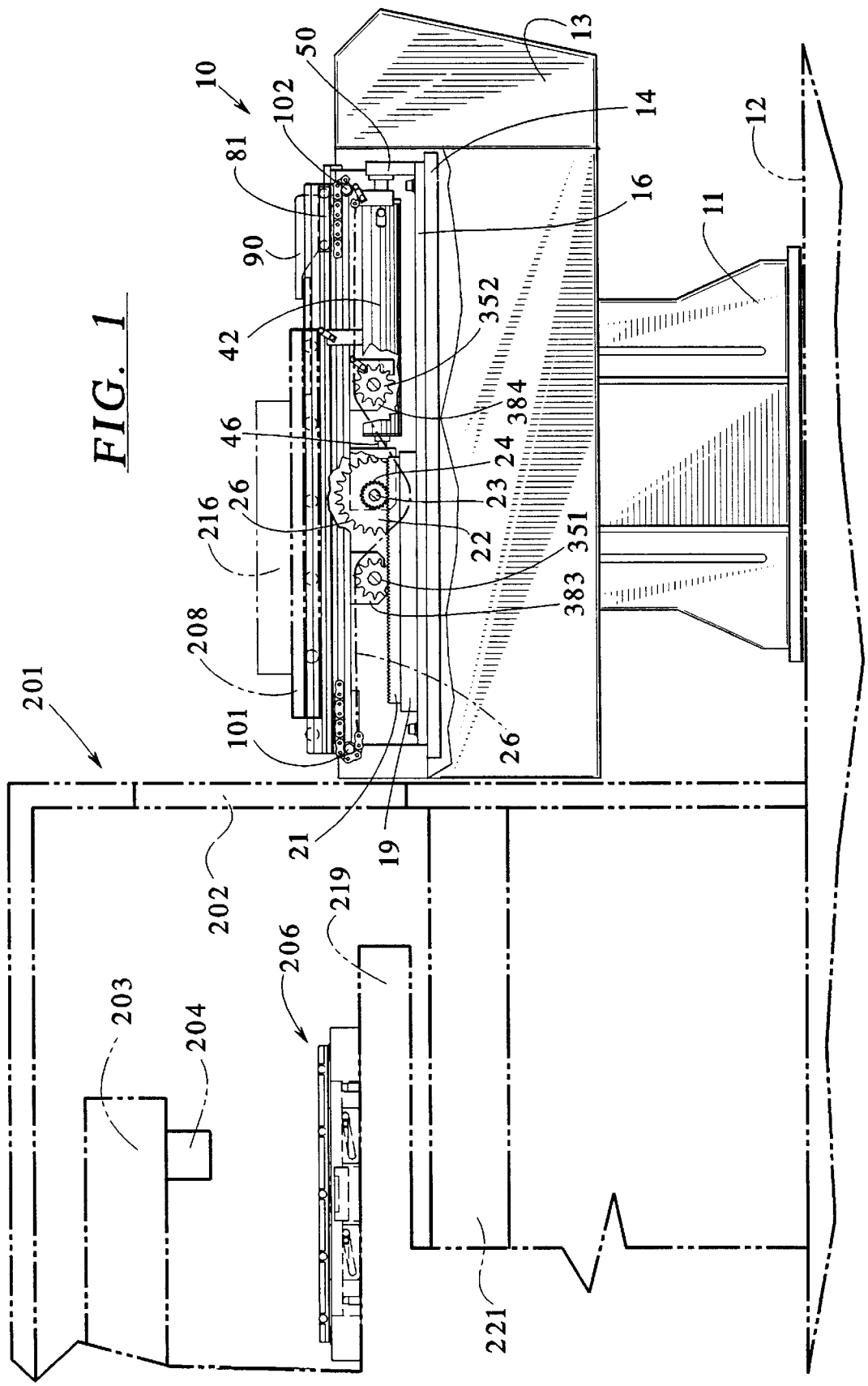
FIG. 1 is a side plan view of the automatic pallet loading system of the invention.
Figure 2:
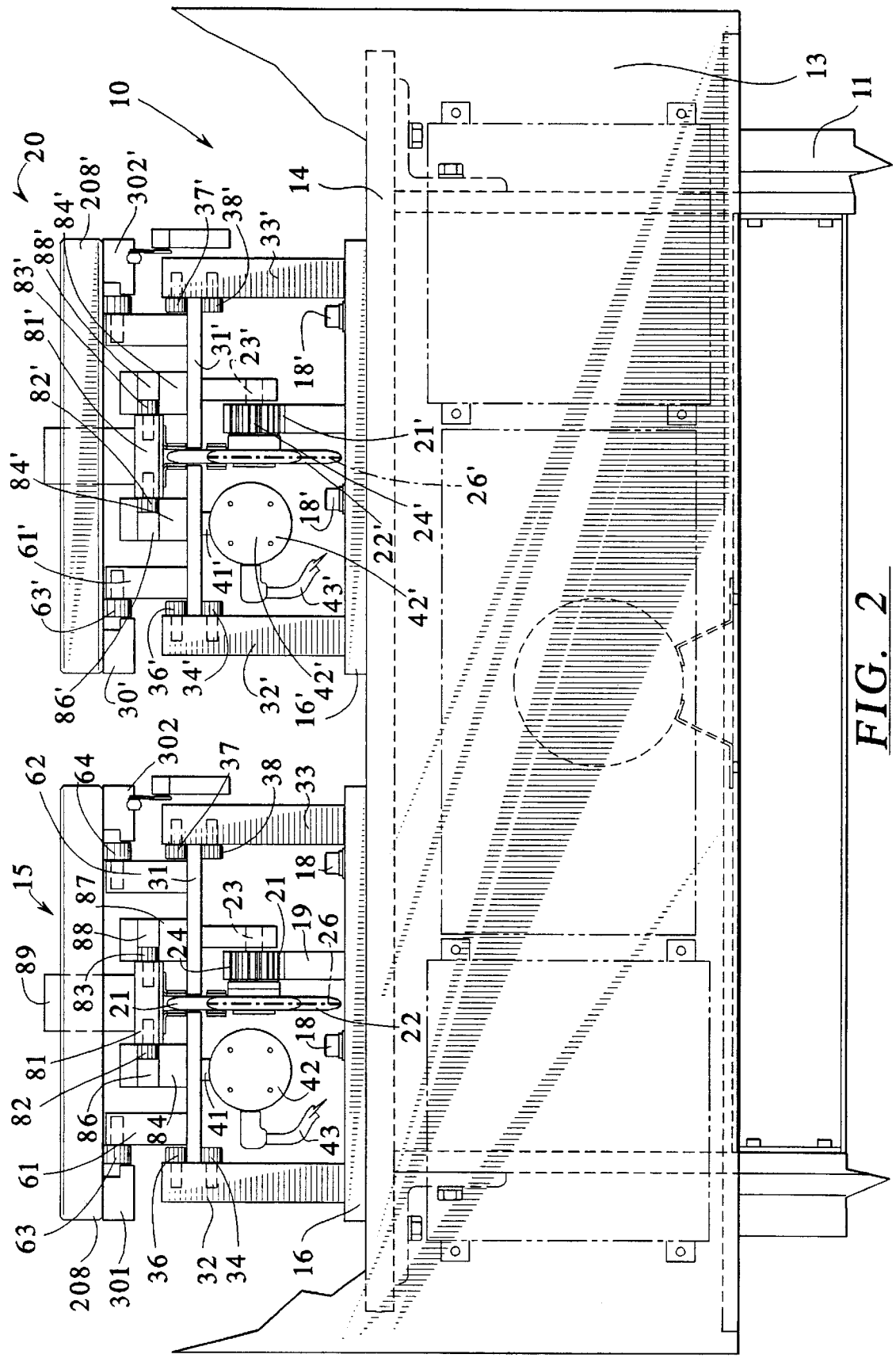
FIG. 2 is a rear plan view of the automatic pallet loading system of the invention.
Figure 3:
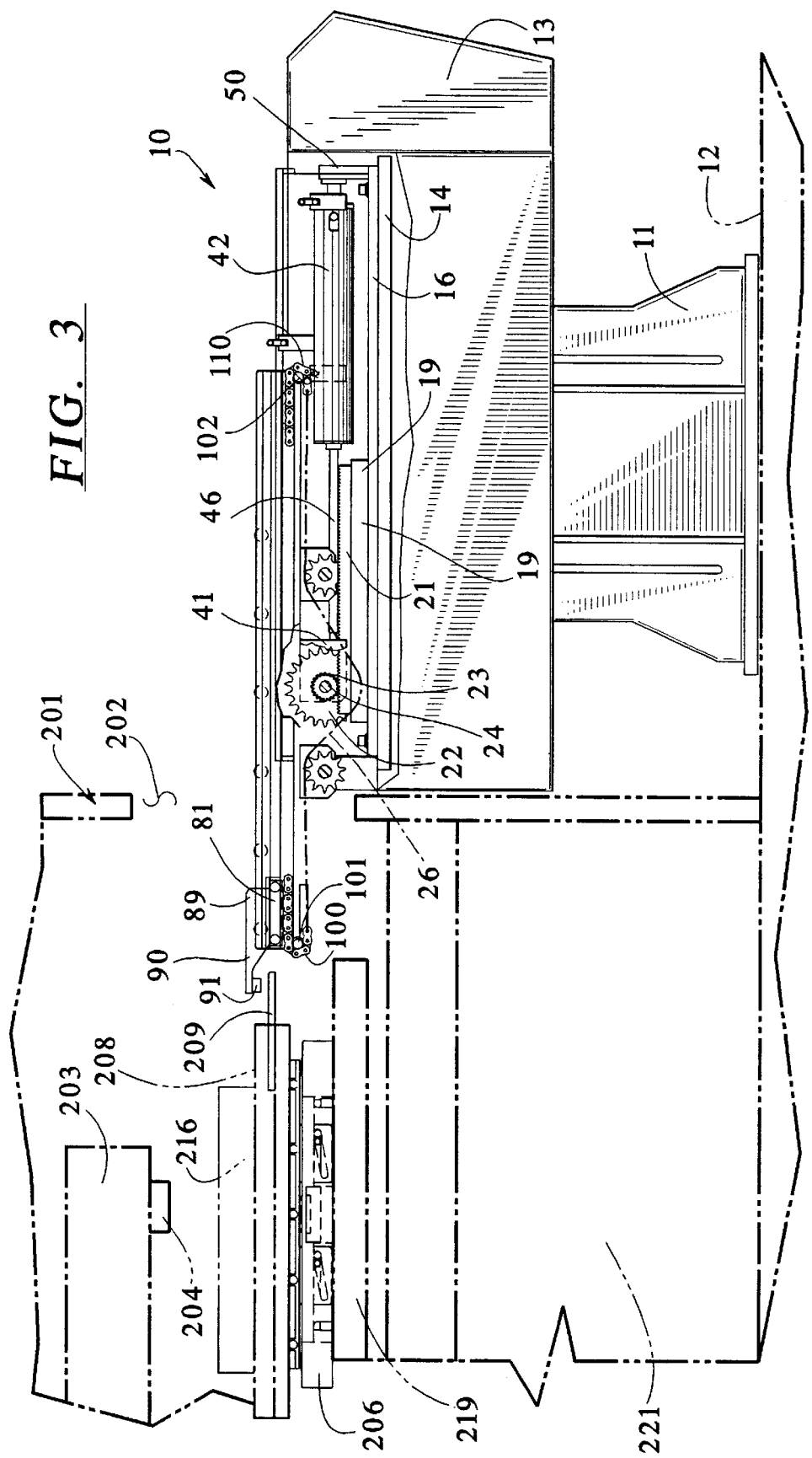
FIG. 3 is a side plan view of the pallet loading system of the invention illustrating one of the pallet carriages in the extended position.

As shown in the FIGS., the pallet exchanging machine 10 has a base 11 which rests on the floor 12. The base 11 supports a frame 14 which has a protective cover 13. As shown in FIGS. 2 and 3, a pair of pallet moving members 15 and 20 are mounted on the base 14. Each of the pallet moving members 15 and 20 are identical, and the pallet moving member 15 will be described in detail. A pair of parallel mounted side members 32 and 33 are mounted on a plate 16 which is connected to the base 14 by suitable bolts 18. A first pallet extending plate 31 comprises a flat rectangular shaped plate movably mounted relative to the members 32 and 33 by means including a first plurality of rollers 36 which are mounted in the member 32 so as to engage the top surface of the plate 31 and a second plurality of rollers 34 mounted in the member 32 so as to engage the bottom surface of the plate 31. The member 33 carries a plurality of upper rollers 37 which engage the top of the plate 31, and a second plurality of rollers 38 are mounted in the member 33 and engage the bottom surface of the plate 31, such that the plate 31 can be moved to the left and right relative to FIGS. 1, 3 and 5 with respect to the base 14. For moving the plate 31, there is a cylinder 42 which has a piston rod 46, and the cylinder 42 has one end mounted to a member 50 attached to the base 14. The end of the piston rod 46 engages an extension 41 attached to the plate 31 so as the cylinder 42 is energized by hydraulic fluid through the conduit 43, the piston rod 46 moves the plate 31 to the left and right relative to FIGS. 1, 3 and 5.

Attached to the upper surface of the plate 31 are a pair of beam members 61 and 62. Adjacent the top of the beam member 61 are mounted a plurality of rollers 63, and adjacent the top of the beam member 62 are mounted a plurality of rollers 64. A pallet 208 has its lower surface engageable and resting on the rollers 63 and 64 so that it can move relative to the members 61 and 62. Downwardly extending members 301 and 302 are generally L-shaped and extend from the lower surface of the pallet 208 and extend inwardly toward the rollers 63 and 64 so as to hold the pallet 208 on the rollers 63 and 64 as it is moved relative to the rollers 63, 64.

Figure 4:
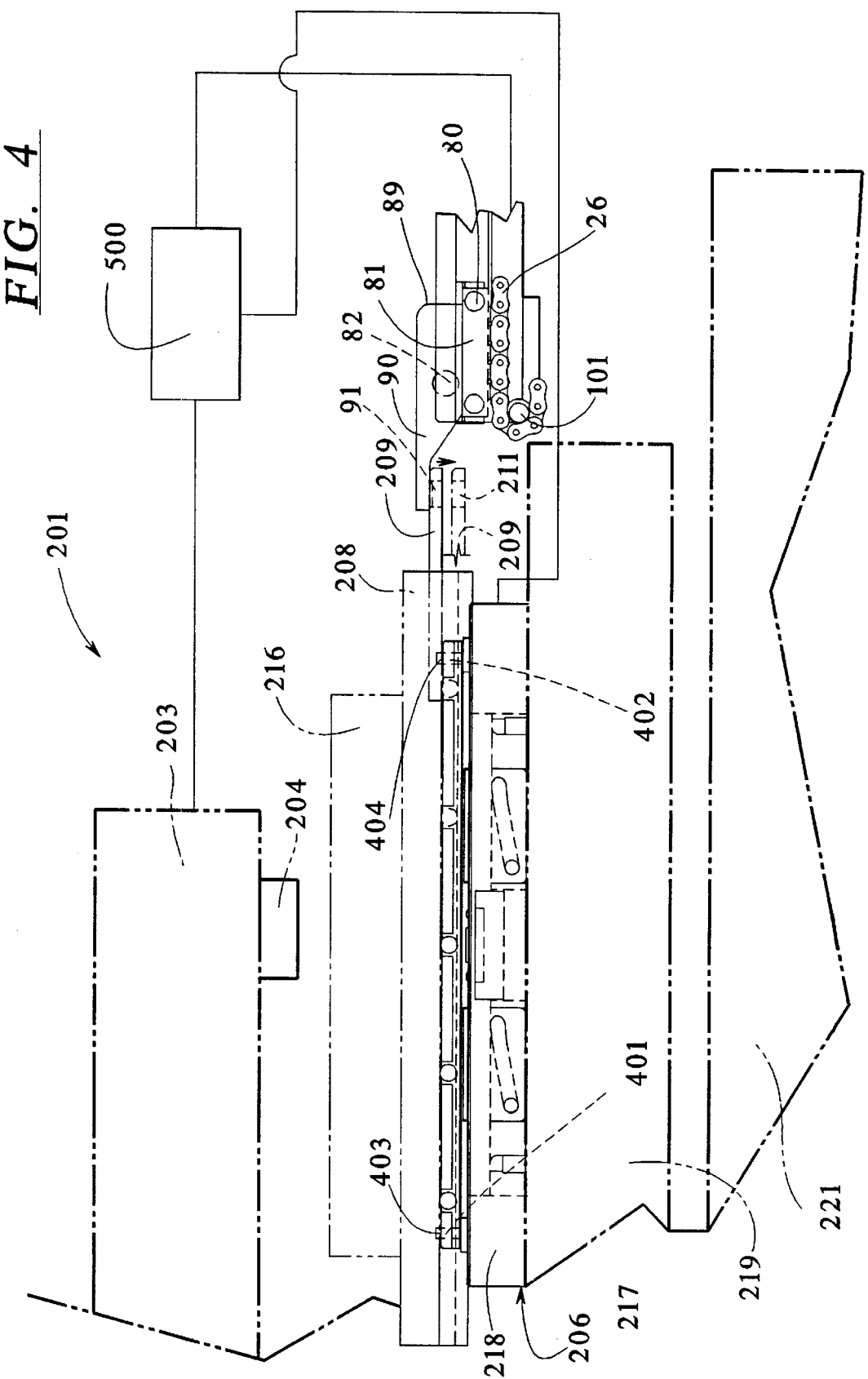
FIG. 4 is an enlarged partially cut-away view illustrating one of the pallet carriages in engagement with a pallet mounted on the receiver.

A carriage 81 is movably mounted relative to the plate 31 by means including a pair of members 84 and 87 which are mounted on the plate 31 and are formed with openings 86 and 88 in which rollers 82 and 83 are mounted. The rollers 82 and 83 are rotatably mounted on the carriage 81. Second rollers 70 and 80 are also mounted on the carriage 81 as shown in the top plan view in FIG. 5. Carriage moving extension 89 extends upwardly from the carriage 81 and has an outwardly extending portion 90 which carries a pin 91 on its lower surface for engaging an opening 211 in an extension member 209 that is connected to the pallet 208 as best shown in FIG. 4.

Figure 5:
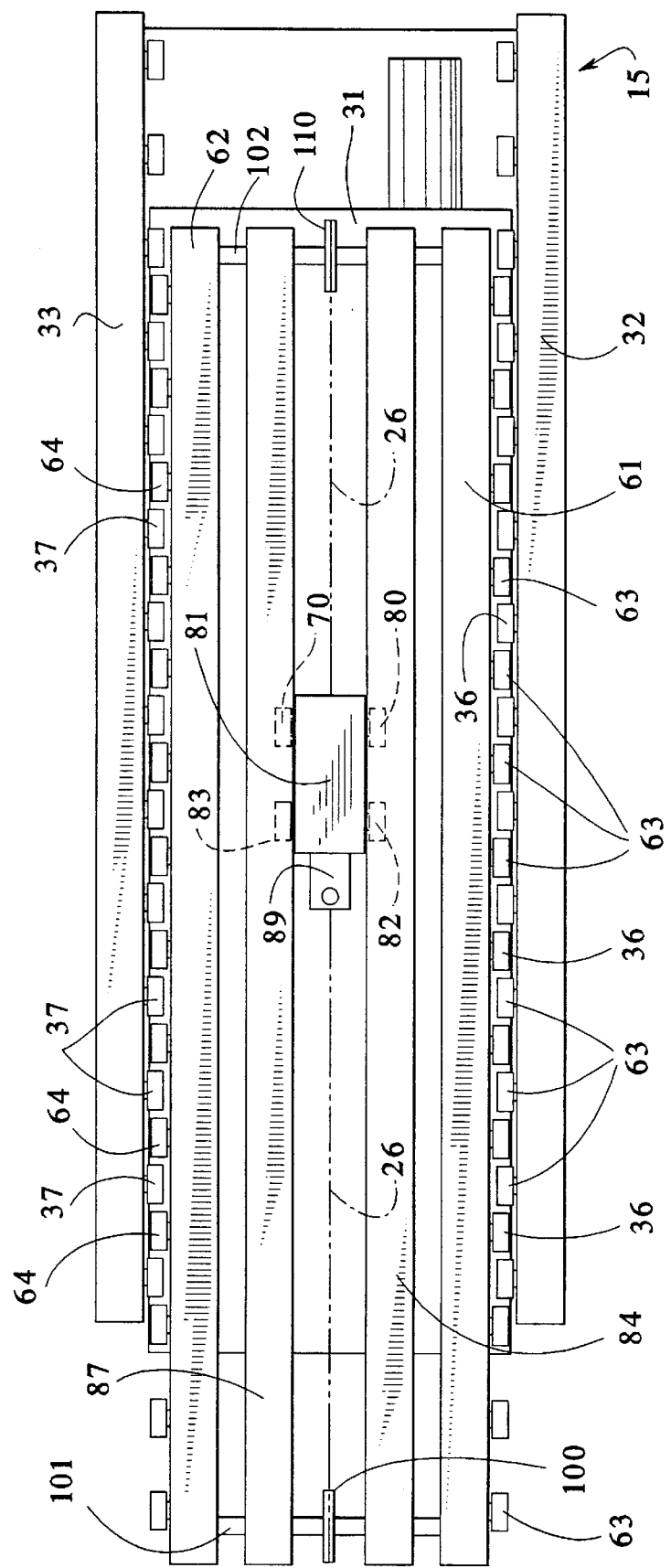
FIG. 5 is a top plan view illustrating the automatic pallet changer machine.

An endless chain 26 is connected to the carriage 81 and passes over sprockets 100 and 110 rotatably mounted between the ends of members 61 and 62 as best shown in FIG. 5. The chain 26 also passes over sprockets 351 and 352 rotatably mounted on the plate 31 as best shown in FIG. 1. The chain 26 also passes over a sprocket 22 which is rotatably mounted by a shaft 23 to the plate 31, and a gear 24 is non-rotatably mounted on the shaft 23 and the sprocket 22 and engages a rack 21 mounted on a plate 19 connected to the plate 16. As the piston 42 is actuated to move the piston rod 46, it moves the plate 31 which causes the gear 24 to move on the rack 21 and as the gear 24 rotates, it drives the sprocket 22 which in turn drives the chain 26 which moves the carriage 81 relative to members 84 and 87 on the plate 31. The sprocket 22 and the gear 24 and the rack 21 cause the plate 31 to move one-half the linear distance of the carriage 81. In other words, in a particular machine constructed according to the invention, the plate 31 moves a total distance of 14 inches from its retracted to the extended position and the carriage 81 moves a total of 28 inches from its retracted to its extended position relative to the base of the machine 11.

The second pallet extender 20 has the same construction as the first pallet extender 15 and will not again be described in detail but as shown by the end view its parts are designed by the same numerals as the pallet extender 15 with the addition of primes to the numeral designations for the pallet extender 20.

The vertical machining center 201 has a window 202 through which the pallets 208 can be inserted and removed from the machine, and the vertical machining center 201 has a tool supporting head 203 for supporting a plurality of tools 204 for forming a workpiece 216 mounted on the pallet 208. The base 221 of the vertical machining center 201 has a machining base 219 upon which a pallet receiver 206 according to the invention is mounted. The control system of the vertical machining center is programmed to move the pallet receiver 206 and the pallet 208 and the workpiece 216 relative to the machining tools 204 so as to machine the workpiece 216. The machining center is also programmed so that when machining is not occurring, it can move the pallet carrier 206 so as to receive from the automatic pallet loading machine 10 a pallet 208 with an unmachined workpiece 216. The pallet receiver 206 can also move relative to the plate 219 so as to unload a pallet 208 with a workpiece 216 which has been machined by the tools 204 onto the pallet loading machine 10. As best shown in FIGS. 4, 6 and 7, the pallet receiver 206 is formed of two portions, a lower portion 217 and an upper portion 218. The lower portion 218 carries a plurality of pins 401 and 402 which engage holes 403 and 404 for indexing the pallet 208 relative to the pallet receiver 206. The upper portion 218 of the pallet receiver 208 has downwardly extending members such as 501 and 502 which are formed with inclined slots 503 and 504 such as shown in FIG. 7, and a first cylinder 511 is mounted to the lower portion 217 and has a piston rod 512 which has its opposite ends connected to carriages 513 and 514 which respectively move on rollers 516, 517, 518 and 519 and 521, 522, 523 and 524 along tracks 526 and 527 attached to the lower member 217 of the pallet receiver 206. The carriage 513 carries an extending shaft upon which are mounted rollers 531 and 532 which move in the slots 503 and 503' of the upper member 218 so as the carriage 513 is moved to the left relative to FIGS. 6 and 7 by piston rod 512, the upper member 218 will be moved vertically away from the lower member 217. Likewise, the carriage 514 carries a shaft upon which are mounted rollers 537 and 536 which are received in slots 204 and 205 in member 502 so as the carriage 514 moves to the left and right on rollers 521, 523, 522 and 524 relative to FIGS. 6 and 7, the upper portion 218 of the pallet receiver 206 moves upwardly and downwardly relative to the lower portion 217. Carriages 613 and 614 are also mounted on the lower portion 217 and carry rollers that are received in slots in downwardly extending portions of the upper member 218 so as the piston rods 512 and 612 are moved to the left and right relative to FIG. 6, the carriages 613 and 614, 513 and 514 move to the left and right thus moving the upper portion 218 upwardly and downwardly relative to the lower portion 217.

Figure 8:
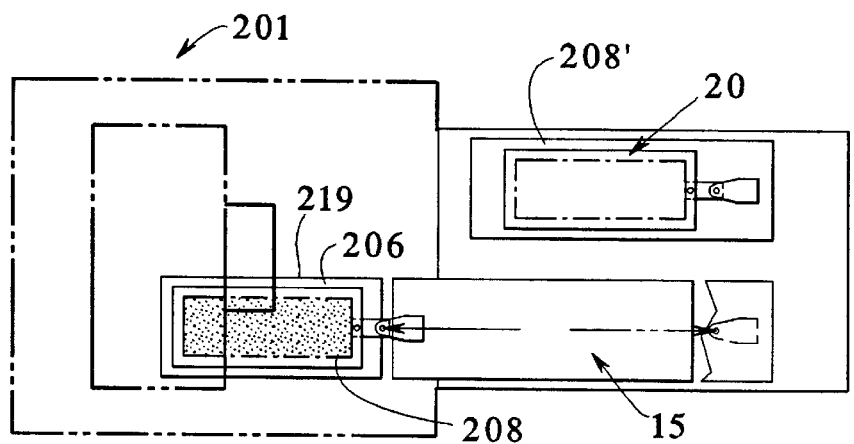
FIG. 8 illustrates one of the pallet carriages in the extended position engaged with a pallet.
Figure 9:
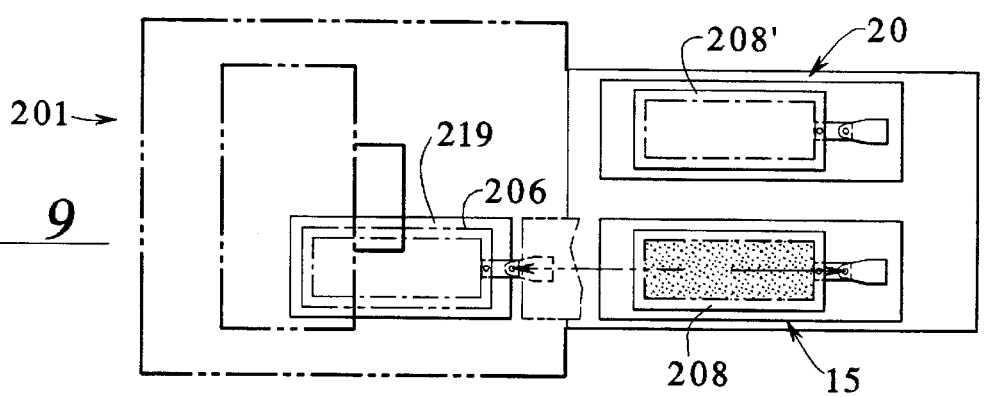
FIG. 9 is a top plan view illustrating the carriages with the pallets in the retracted position.

When the upper portion 218 of the carrier 206 is in the raised position relative to the lower portion 217 as shown in FIG. 4, the arm 209 of the pallet 208 will engage the pin 91 of the extension 90 carried by the carriage 81 such that if the pallet moving member 15 retracts from the position shown in FIGS. 4 and 8 to the position shown in FIG. 9, it will draw the pallet 208 onto the rollers 63 and 64 of the pallet extender 13 and retract it to the position shown in FIG. 9. Then the carriage 222 will move the receiver 206 to a position where it is aligned with the pallet extender 20 and then the pallet extender 20 can extend and place upon the pallet 208 a new workpiece 216. After the pallet has been received on the receiver 206, the cylinders 511 and 611 will be actuated so as to lower the portion 218 relative to the portion 217 and disengage the pin 91 from the arm 209. Subsequently, the receiver 206 and the workpiece 216 will move into the machine so that the workpiece can be suitably machined.

Figure 10:
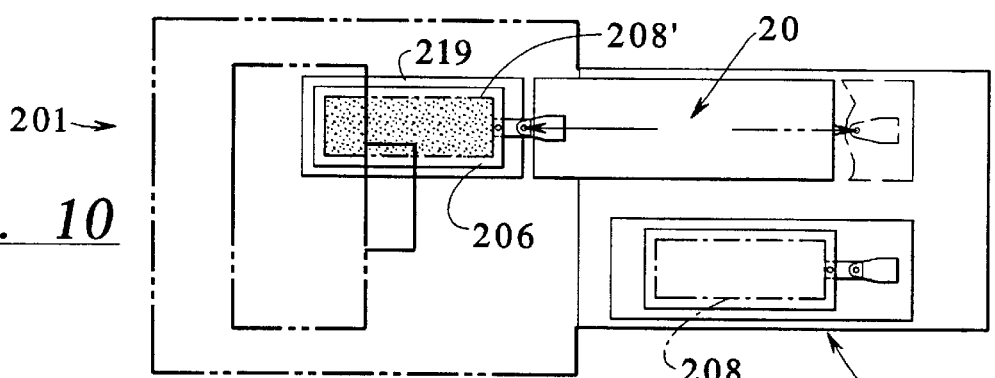
FIG. 10 is a top plan view illustrating the second pallet carriage in the extended position.
Figure 11:
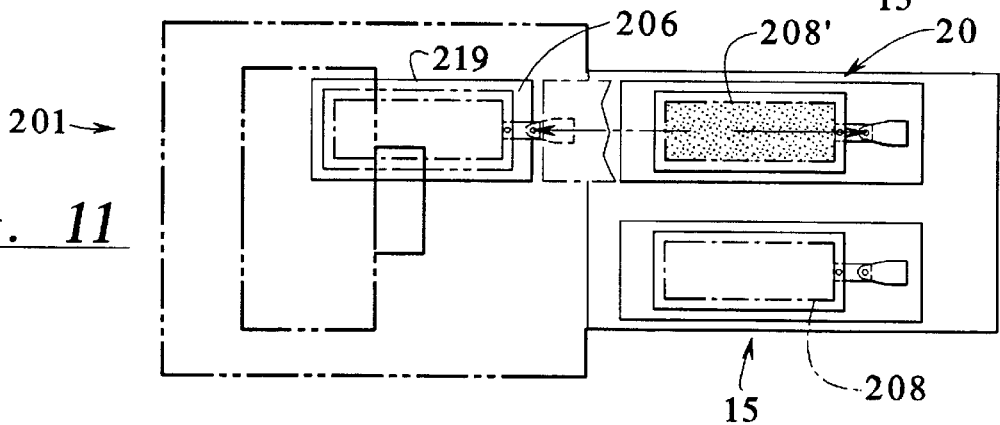
FIG. 11 illustrates the second pallet carriage in the retracted position.

FIGS. 8 to 11 are top plan views illustrating the pallet extenders in various positions. In FIG. 8, the pallet moving member 15 is in a position to place a pallet 208 on the receiver 206 in the machine 201. After the machine 201 has completed the workpiece on the pallet 208, the receiver 206 moves so that the pallet moving member 15 can remove the pallet and the workpiece, as shown in FIG. 9. Then the receiver 206 is aligned with the pallet moving member 20 as shown in FIG. 10, and the member 20 loads a pallet 208' on the receiver 206. After the workpiece on the pallet 208' has been completely machined by the machine 201, the pallet 208 moves to the position shown in FIG. 11, and the pallet 208' is removed from the machine by the member 20.

As shown in FIG. 4, the control 500 of the machine 201 also controls the tools of the machine 201, the cylinders 42 and 42' to extend the carriages 81 and 81' as well as the cylinders 511 and 611 of the receiver 206 in the proper timed sequence.

It is seen that this invention provides a new and novel pallet extending and retracting mechanism, and although the invention has been described with respect to preferred embodiments, it is not to be so limited as changes and modifications can be made which are within the full intended scope of the invention as defined by the appended claims.

I claim as my invention:

1. An automatic pallet changing machine for an automatic machining center which has a control for machining tools and for a movable machining carriage comprising:

a pallet moving member mounted adjacent said automatic machining center and having a first pallet extending plate mounted on said pallet moving member;

first driving means connected to said first pallet extending plate to move it toward and away from said automatic machining center;

a first pallet moving means movably mounted on said first pallet extending plate and movably mounted thereon;

second driving means connected to said first pallet moving means to move it;

a first pallet movably mounted on said first pallet extending plate and engageable with said first pallet moving means;

a pallet receiver mounted on said machining carriage and having upper and lower portions which are movable in the vertical plane relative to each other;

third driving means connected to said upper and lower portions to move them relative to each other; and a control for said automatic machining center connected to said first, second and third driving means and to said machining carriage to move said machining carriage and said pallet receiver adjacent said first pallet extending plate, said control energizing said first, second and third driving means to raise said upper portion of said pallet receiver and to then extend said first pallet extending plate and said first pallet movable means so as to move a pallet from said pallet moving member onto said pallet receiver.

2. The automatic pallet changing machine according to claim 1 wherein said first drive means is a cylinder and a piston.

3. The automatic pallet changing machine according to claim 1 further comprising:

an endless chain movably mounted on said first pallet extending plate and attached to said first pallet moving means;

a sprocket rotatably mounted on said first pallet extending plate and said endless chain engageable therewith;

a rack mounted on said pallet moving member; and a gear attached to said sprocket and engageable with said rack.

4. The automatic pallet changing machine according to claim 1 wherein said third driving means comprises said pallet receiver upper portion formed with a pair of downwardly receiving members formed with slanted slots, a pair of rollers mounted on a shaft receivable in said slanted slots and a second cylinder mounted on said lower portion and a piston rod in said second cylinder and attached to said shaft.

5. An automatic pallet machine for an automatic machining center which has a control for machining tools and for a movable machining carriage comprising:

first and second pallet moving members mounted adjacent said automatic machining center, said movable machining carriage movable to align with either said first and second pallet moving members so that said first pallet moving member can move a first pallet onto said movable machining carriage so that it can be machined by said automatic machining center after which said movable machining carriage moves again adjacent said first pallet moving member and said first pallet is moved onto said first pallet moving member, said movable machining carriage movable adjacent said second pallet moving member which moves a second pallet onto said movable carriage so that it can be machined by said automatic machining center after which said movable machining carriage moves again adjacent said second pallet moving member and said second pallet is moved onto said second pallet moving member wherein a first set of rollers and a second set of rollers associated with the first pallet moving member and the second pallet moving member, respectively, are implemented to move the pallet to and from the machining carriage.

6. The automatic pallet machine according to claim 5 wherein said movable machining carriage carries a pallet receiver for receiving said first and second pallets and is formed of upper and lower portions which are vertically movable so that in an upper position said pallet receiver can receive and discharge a pallet to said first and second pallet moving members and in a lower position locks said pallet to said movable machining carriage.

7. The automatic pallet machine according to claim 6 wherein said control is connected to said first and second pallet moving members, to said movable machining carriage, and to said pallet receiver.

8. The automatic pallet machine according to claim 5 wherein said pallet receiving members each have pallet engaging means for moving said pallets.

\* \* \* \* \*

UNITED STATES PATENT AND TRADEMARK OFFICE
CERTIFICATE OF CORRECTION

PATENT NO. : 5,813,514
DATED : September 29, 1998
INVENTOR(S) : Malcolm E. Keith It is certified that error appears in the above-identified patent and that said Letters Patent is hereby corrected as shown below:

Column 1, line 24, change "furnished" to read --finished--.
Column 1, lines 29 and 31 insert "is" after "position".
Column 3, line 47, insert "," after "detail".
Column 3, line 47, change "designed" to read --designated--.
Column 4, line 4, change "lower portion 218" to read --upper portion 218".
Column 4, line 9, insert "," after "504".
Column 4, line 64 change "208" to read --208'--

Signed and Sealed this

Thirtieth Day of March, 1999

Attest:

Attesting Officer

Q. TODD DICKINSON

Acting Commissioner of Patents and Trademarks